United States Patent  
Pyo et al.

(10) Patent No.: US 7,693,319 B2  
(45) Date of Patent: Apr. 6, 2010

(54) METHOD FOR CARVING VOLUME DATA BASED ON IMAGE

(75) Inventors: Soon-Hyoung Pyo, Daejon (KR); Byoung-Tae Choi, Daejon (KR); Seung-Taik Oh, Daejon (KR); Bo-Youn Kim, Daejon (KR); Hyun-Bin Kim, Daejon (KR)

(73) Assignee: Electronics and Telecommunications Research Institute (KR)

( * ) Notice: Subject to any disclaimer, the term of this patent is extended or adjusted under 35 U.S.C. 154(b) by 892 days.

(21) Appl. No.: 11/300,188

(22) Filed: Dec. 13, 2005

(65) Prior Publication Data

US 2006/0133665 A1    Jun. 22, 2006

(30) Foreign Application Priority Data

Dec. 16, 2004   (KR) ...................... 10-2004-0107272

(51) Int. Cl.  
*G06K 9/00* (2006.01)

(52) U.S. Cl. ...................................................... 382/128

(58) Field of Classification Search ......... 382/128–134; 345/419–427, 619–689; 348/571–721  
See application file for complete search history.

(56) References Cited

U.S. PATENT DOCUMENTS 6,373,487 B1 * 4/2002 Culbertson et al. .......... 345/424  
2005/0104881 A1   5/2005 Yoshida et al.

FOREIGN PATENT DOCUMENTS

JP        06-076073       3/1994  
KR    1020020073841     9/2002

OTHER PUBLICATIONS

Philippe Lacroute, Marc Levoy, "Fast Volume Rendering Using a Shear-Warp Factorization of the Viewing Transformation", In Proceedings of SIGGJUPH '94, Orlando, Florida, Jul. 1994, pp. 451-458.*  
Dan Snow et al., "Exact Voxel Occupancy with Graph Cuts", Computer Vision and Pattern Recognition Conference, vol. 1, pp. 345-352, 2000.  
Soon Hyoung Pyo et al. "Fast Volume Carving", Eurographics 2002 Short Presentation, 2002 (8 pp.).

* cited by examiner

Primary Examiner—Samir A. Ahmed  
Assistant Examiner—Atiba O Fitzpatrick  
(74) Attorney, Agent, or Firm—Blakely, Sokoloff, Taylor & Zafman

(57) ABSTRACT

Provided is an image-based volume data carving method for rapidly carving a specific area of dimensional volume data based on images. The method includes the steps of: generating a mask image to be carved from an input image; dividing a viewing transform matrix of the mask image into a shear transform matrix and a warp transform matrix, and calculating a scale factor from the shear transform matrix; modifying the mask image to be parallel to an axis of the volume data; shearing a volume slice in such a manner that the volume data can be parallel to viewing rays passing through a volume, and scaling the size of the volume slice; and carving part of the volume slice through an operation between the mask image and each volume slice.

2 Claims, 4 Drawing Sheets

METHOD FOR CARVING VOLUME DATA BASED ON IMAGE

FIELD OF THE INVENTION

The present invention relates to a method for carving volume data based on an image; and, more particularly, to an image-based volume data carving method for carving a specific area of dimensional volume data rapidly based on image.

DESCRIPTION OF RELATED ART

Volume data are mainly used in a medical image field and made to visualize a three-dimension by accumulating a series of images obtained through a computed tomography (CT) or a two-dimensional Magnetic Resonance Imaging (MRI). Besides, the method forming a space and an object with volume data is used to restore an object whose photograph is taken on the spot into a three-dimension (3D) in a field of a computer vision.

The volume data carving method described above can be used to carve skin tissues covering the outside of internal organs that a radiotherapist tries to look at in case of medical image field and to restore a 3D object based on silhouette information of the object appearing in a real picture and camera information in case of the computer vision.

A conventional volume carving method mainly used an object-centered method, e.g., there is a method that projects each voxel forming the volume data in an image and determines the presence of the voxel carve according to the projected position, i.e., whether the projected object is in the inside of the object or not. However, the conventional object-centered method has a problem that it requires much time since the procedure should be performed with respect to all voxels. It is also possible to bind and process a plurality of voxels of the conventional object-centered method, but it has a problem that the efficiency is low.

SUMMARY OF THE INVENTION

It is, therefore, an object of the present invention to provide an image-based volume data carving method for carving a specific area of three-dimensional volume data rapidly based on an image.

Other objects and advantages of the invention will be understood by the following description and become more apparent from the embodiments in accordance with the present invention, which is set forth hereinafter. It will be also apparent that objects and aspects of the invention can be embodied easily by the means defined in the claims and combinations thereof.

In accordance with an aspect of the present invention, there is provided a method for carving volume data based on an image, including the steps of: a) generating a mask image to be carved from an input image; b) dividing a viewing transform matrix of the mask image into a shear transform matrix and a warp transform matrix, and calculating a scale factor from the shear transform matrix; c) modifying the mask image to be parallel to an axis of the volume data based on the viewing transform matrix; d) shearing a volume slice in such a manner that the volume slices can be perpendicular to main viewing ray passing through a volume by using the mask image, and scaling the size of the volume slice by using the scale factor to make all viewing rays be parallel to each other; and e) carving part of the volume slice through an Boolean operation between the mask image modified in the step c) and each volume slice sheared/scaled in the step d).

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

Other objects and aspects of the invention will become apparent from the following description of the embodiments with reference to the accompanying drawings, which is set forth hereinafter.

Other objects and advantages of the present invention will become apparent from the following description of the embodiments with reference to the accompanying drawings. Therefore, those skilled in the art can embody the technological concept and scope of the invention easily. In addition, if it is considered that detailed description on the prior art may blur the point of the present invention, the detailed description will not be provided herein. The preferred embodiments of the present invention will be described in detail hereinafter with reference to the attached drawings.

Figure 1:
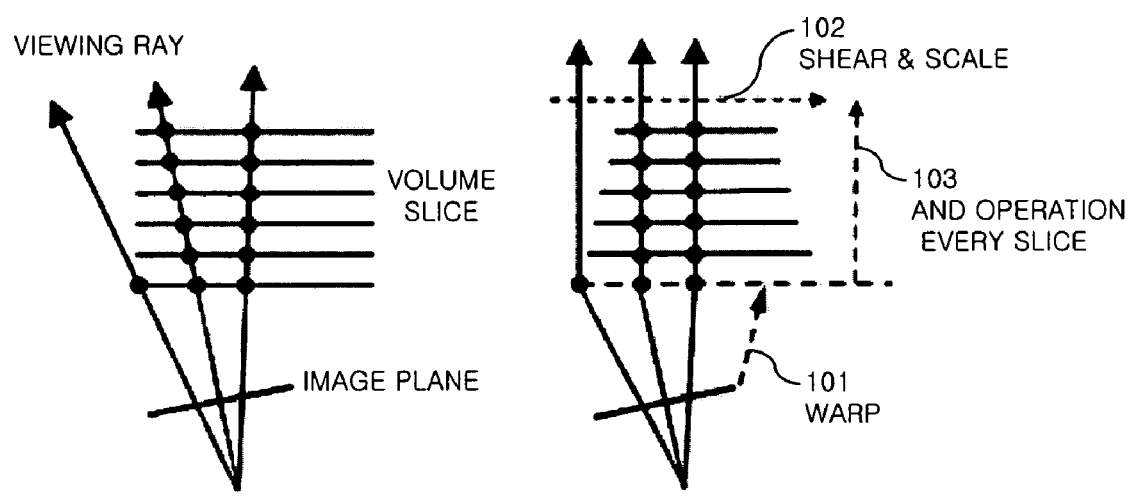
FIG. 1 is a diagram showing a volume data carving method based on an image in accordance with an embodiment of the present invention.

FIG. 1 is a diagram showing a volume data carving method based on an image in accordance with an embodiment of the present invention and shows a method to carve a specific area of three-dimensional (3D) volume data.

The present invention provides an efficient algorithm that cuts volume data showing a 3D space by using a mask image shown in an arbitrary direction. Each mask image includes information about a position and a direction of a far-to-near projection camera. The present invention performs warping, scaling the image into a volume space, shearing and cutting the volume through a Boolean operation. That is, the present invention is a technology for editing the volume data, which composes a 3D space, based on image information seen from an arbitrary. The technology carves an unnecessary element through a Boolean operation procedure between image modification and volume data modification from the mask image and the camera information of the mask image.

The method of the present invention can be divided as follows.

First, the mask image is warped to be parallel to an axis of the volume data by using the viewing transform matrix of the image corresponding to the camera information (see 101). Second, the volume data are sheared and scaled so that rays passing through the volume are parallel to each other (see 102). Third, a part of the volume slice is carved by performing an AND operation with respect to each volume slide and warped image (see 103). Herein, the warped image should be a mask image where the part to be carved is "0", and the part to remain is "1".

The present invention is based on a shear-warp factorization method. The viewing transform matrix showing the camera information of the image can be expressed as a multiplication of the shear transform matrix S by warp transform matrix $M_{warp}$, just as the following equation 1:

$$M_{warp} = S^{-1} \cdot M_{view} \qquad \text{Eq. 1}$$

where $M_{view}$ denotes Given viewing transform of the image.

If the camera projection method is parallel, the shear transform matrix is as expressed in equation 2.

$$S_{parallel} = \begin{pmatrix} 1 & 0 & 0 & 0 \\ 0 & 1 & 0 & 0 \\ S_x & S_y & 1 & 0 \\ 0 & 0 & 0 & 1 \end{pmatrix} \qquad \text{Eq. 2}$$

Herein, Sx and Sy can be easily acquired from the viewing transform matrix. Now since the matrix S is known, the warp transform matrix can be acquired based on equation 3.

$$M_{warp} = S^{-1} \cdot M_{view} \qquad \text{Eq. 3}$$

However, since the viewing rays are spread in case that the camera projection method is a near-to-far projection, scaling of a volume slice is required to make the viewing rays to be parallel. Therefore, considering characteristics of the shear transform matrix $S_{perspective}$, the pure shear transform matrix $M_{shear}$ and scale transform matrix $M_{scale}$ are obtained from the shear transform matrix $S_{perspective}$, which is shown in equation 4.

$$S_{perspective} = M_{scale} \cdot M_{shear} = \begin{pmatrix} 1 & 0 & -\frac{e_{o,x}}{e_{o,z}} & 0 \\ 0 & 1 & -\frac{e_{o,y}}{e_{o,z}} & 0 \\ 0 & 0 & 1 & 0 \\ 0 & 0 & -\frac{e_{o,w}}{e_{o,z}} & 1 \end{pmatrix} \qquad \text{Eq. 4}$$

where each of $e_{o,x}$, $e_{o,y}$, $e_{o,z}$ and $e_{o,w}$ denotes x, y, z and w coordinates of an eye in an coordinate system of each object.

Figure 2:
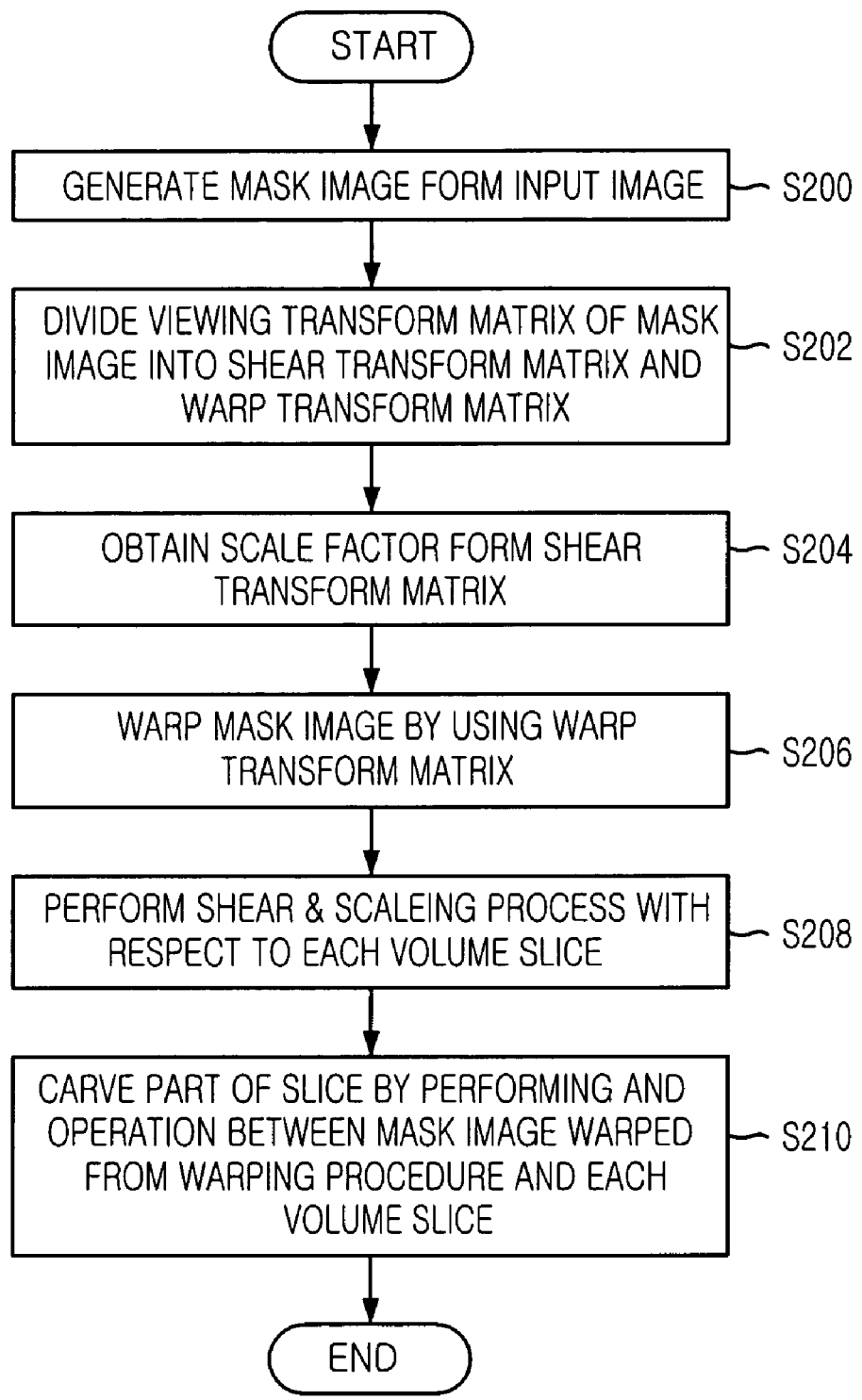
FIG. 2 is a flowchart describing a volume data carving method based on an image in accordance with an embodiment of the present invention.

FIG. 2 is a flowchart describing a volume data carving method based on an image in accordance with an embodiment of the present invention.

At step S200, a mask image which is an object to be carved is generated from an input image and, at step S202, a viewing transform matrix of the mask image is divided into a shear transform matrix and a warp transform matrix. At step S204, a scale factor is obtained from the shear transform matrix and, at step S206, a warping procedure is performed to modify the mask image to be parallel to an axis of volume data by using the viewing transform matrix. At step S208, each volume slice is moved in such a manner that the volume data can be parallel to a viewing ray passing through a volume based on camera information. At step S208, shear/scale procedure is performed to control the size of each volume slice by using the scale factor found at the step S204.

At step S210, the part of the volume slice is carved by performing an AND operation between the mask image modified at the step S206 and each volume slice sheared/scaled at the step S208.

Figure 3A:
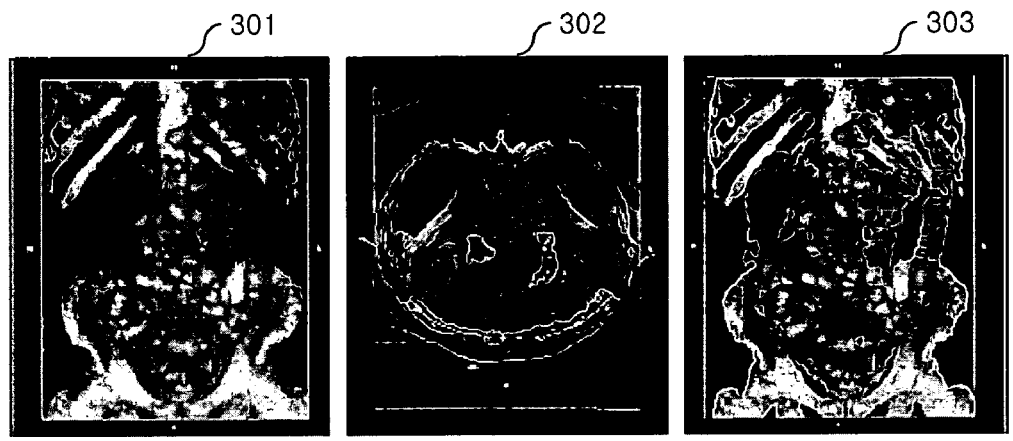
FIGS. 3A and 3B are photographs showing a volume carving procedure in accordance with an embodiment of the present invention.
Figure 3B:
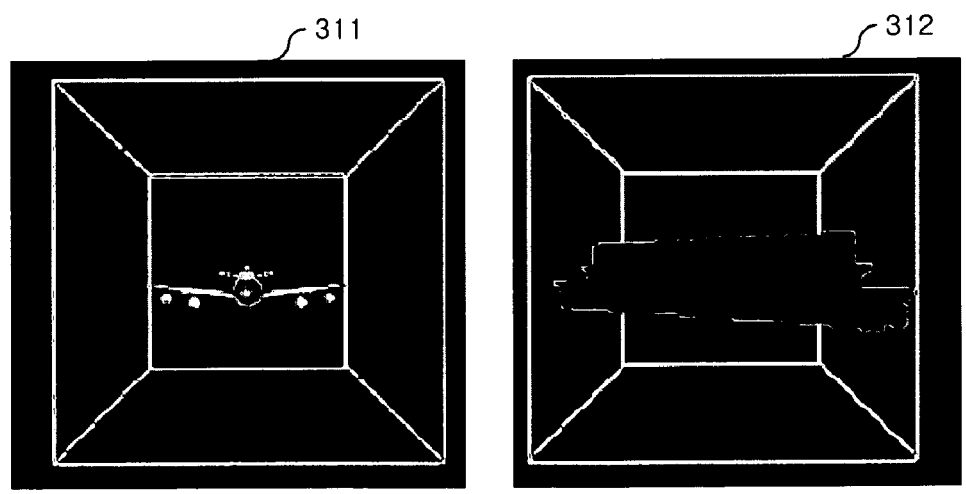

FIGS. 3A and 3B are photographs showing a volume carving procedure in accordance with an embodiment of the present invention.

FIG. 3A shows a procedure carving an image of skin tissues covering the outside of internal organs that a radiotherapist tries to look at. The reference numeral "301" denotes an image before a volume is carved, and the reference numeral "302" is an image that the volume is being carved, while the reference numeral "303" is an image after the volume is carved.

In FIG. 3B, the reference numeral "311" is an image before a volume is carved and the reference numeral "312" is an image after the volume is carved.

Figure 4:
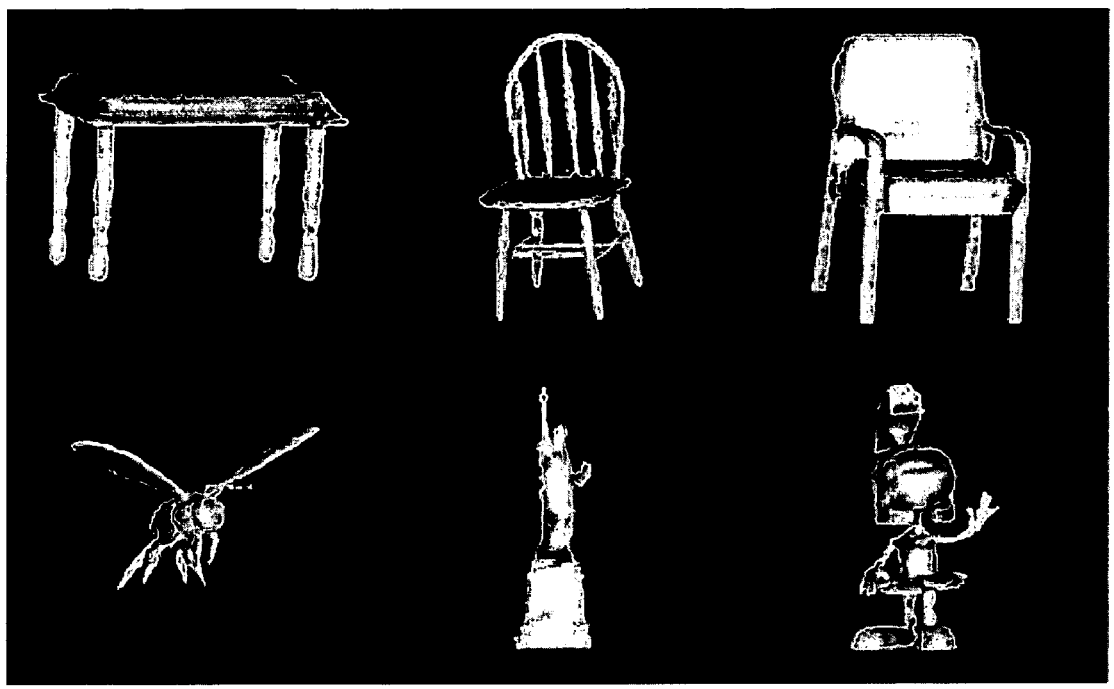
FIG. 4 is a photograph showing three-dimensional (3D) object restoration through a silhouette carving in accordance with an embodiment of the present invention.

FIG. 4 is a photograph showing three-dimensional (3D) object restoration through a silhouette carving in accordance with an embodiment of the present invention and shows an embodiment that the 3D object is restored based on silhouette information appearing in a real picture and camera information in case of the computer vision.

As described in detail, the present invention can be embodied as a program and stored in a computer-readable recording medium, such as CD-ROM, RAM, ROM, a floppy disk, a hard disk and a magneto-optical disk. Since the process can be easily implemented by those skilled in the art, further description will not be provided herein.

In the field of medical image, the technology of present invention can carve skin tissues covering a part where a user tries to look at or does not want, and it can be applied to a technology restoring a 3D object from images.

In other words, the technology of the present invention can be used to carve an image of skin tissues covering the outside of internal organs that a radiotherapist tries to look at in the medical image field, and restore the 3D object based on silhouette information appearing in a real picture and camera information in the computer vision.

Also, the present invention can save much time by performing an AND operation once on one voxel.

The present application contains subject matter related to Korean patent application No. 2004-0107272, filed with the Korean Intellectual Property Office on Dec. 16, 2004, the entire contents of which is incorporated herein by reference.

While the present invention has been described with respect to certain preferred embodiments, it will be apparent to those skilled in the art that various changes and modifications may be made without departing from the scope of the invention as defined in the following claims.

What is claimed is:

1. A computer-readable medium that stores executable instructions to carve volume data based on an image, the instructions for causing a machine to perform the steps of:

a) generating a mask image to be carved from an input image;

b) dividing a viewing transform matrix of the mask image into a shear transform matrix and a warp transform matrix, and calculating a scale factor from the shear transform matrix, wherein a transform matrix $M_{scale}$ is acquired from the shear transform matrix in consideration of characteristics of the shear transform matrix when a camera projection method is a near-to-far projection wherein the scale transform matrix is acquired by dividing the shear transform matrix $S_{perspective}$ into a pure shear transform matrix $M_{shear}$ and a scale transform matrix $M_{scale}$ in consideration of characteristics of the shear transform matrix based on matrix relationship shown in an equation which is expressed as:

$$S_{Perspective} = M_{Scale} \cdot M_{Shear} = \begin{pmatrix} 1 & 0 & -\frac{e_{o,w}}{e_{o,x}} & 0 \\ 0 & 1 & -\frac{e_{o,y}}{e_{o,z}} & 0 \\ 0 & 0 & 1 & 0 \\ 0 & 0 & -\frac{e_{o,w}}{e_{o,z}} & 1 \end{pmatrix}$$

where $e_{o,x}$, $e_{o,y}$, $e_{o,z}$, and $e_{o,w}$ denotes x, y, z and w coordinates in an eye on coordinate system for an object, respectively;

c) modifying the mask image to be parallel to an axis of the volume data based on the viewing transform matrix;

d) shearing a volume slice in such a manner that the volume data can be parallel to viewing rays passing through a volume by using the mask image, and scaling the size of the volume slice by using the scale factor; and e) carving part of the volume slice through an operation between the mask image modified in the step c) and each volume slice sheared/scaled in the step d).

2. The computer-readable medium as recited in claim 1, wherein in the scale factor calculating procedure of the step b) finds the scale transform matrix $M_{scale}$ is acquired from the shear transform matrix in consideration of characteristics of the shear transform matrix when a camera projection method is a near-to-far projection.

* * * * *